United States Patent [19]
Nonaka

[11] Patent Number: 5,184,589
[45] Date of Patent: Feb. 9, 1993

[54] FUEL INJECTION CONTROL SYSTEM

[75] Inventor: Kimihiro Nonaka, Hamamatsu, Japan

[73] Assignee: Yamaha Hatsudoki Kabushiki Kaisha, Iwata, Japan

[21] Appl. No.: 791,208

[22] Filed: Nov. 13, 1991

[30] Foreign Application Priority Data

Nov. 13, 1990 [JP] Japan ................. 2-303835

[51] Int. Cl.⁵ .......................................... F02D 31/00
[52] U.S. Cl. ................... 123/352; 364/426.04
[58] Field of Search ............... 123/352, 357, 339; 180/176, 179; 364/426.04, 431.07, 424.1, 442

[56] References Cited

U.S. PATENT DOCUMENTS

| | | | |
|---|---|---|---|
| 4,914,597 | 4/1990 | Moncelle et al. | 364/426.04 |
| 4,967,358 | 10/1990 | Etoh | 364/426.04 |
| 5,043,647 | 8/1991 | Flaig et al. | 123/352 |

FOREIGN PATENT DOCUMENTS 2-252968 10/1990 Japan.

OTHER PUBLICATIONS

U.S. patent application Ser. No. 408,868, filed Sep. 18, 1989.

Primary Examiner—Raymond A. Neill
Attorney, Agent, or Firm—Kenyon & Kenyon

[57] ABSTRACT

An apparatus for controlling the speed of a direct fuel injected, scavenged two stroke engine comprises engine speed sensing means for determining the speed of revolution of an engine and means for sensing the degree to which the throttle. A comparing device produces a signal corresponding to the difference between the engine speed sensed by the engine speed sensing means and a predetermined engine speed corresponding to the degree of throttle opening. An control device adjusts an engine running parameter based on this difference.

15 Claims, 8 Drawing Sheets

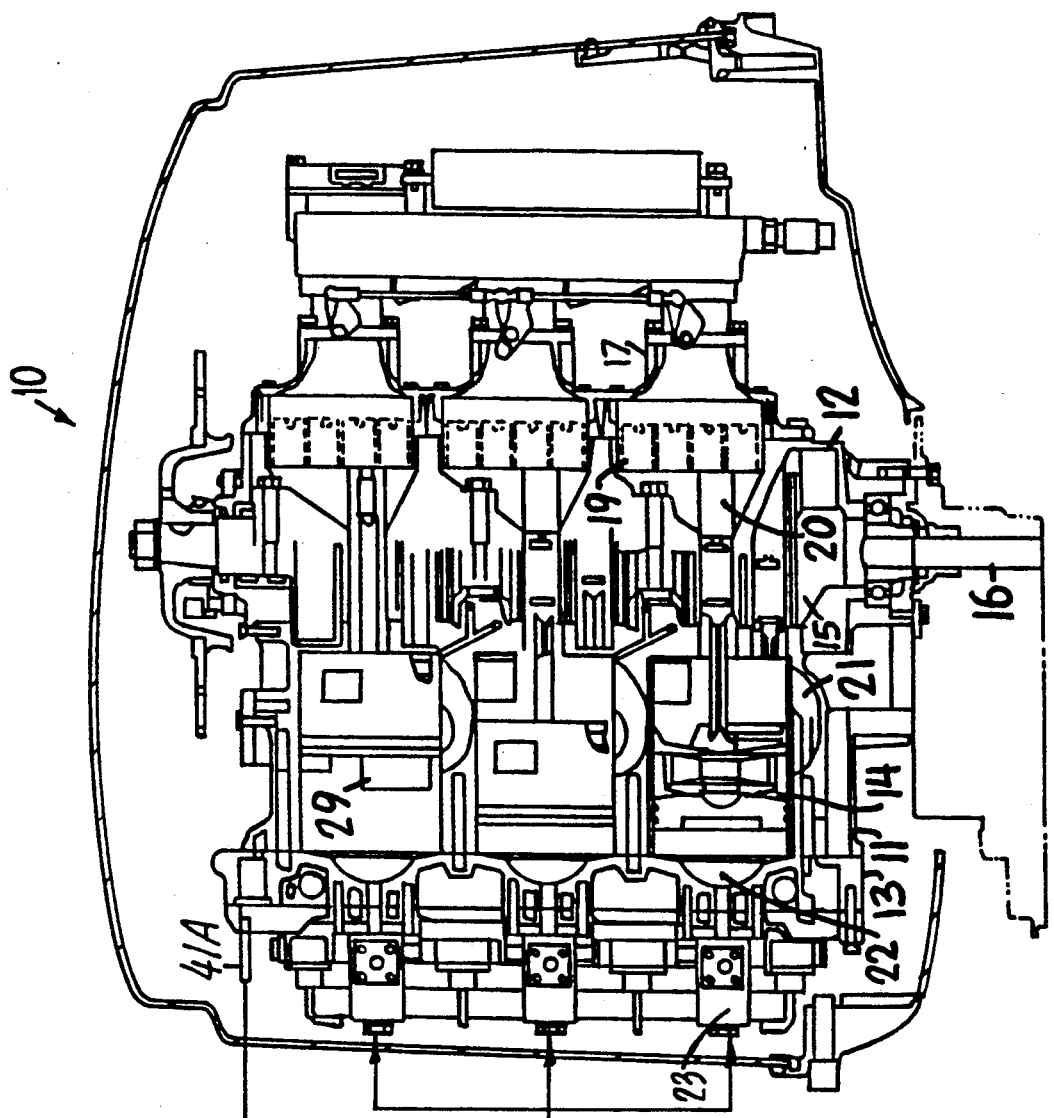
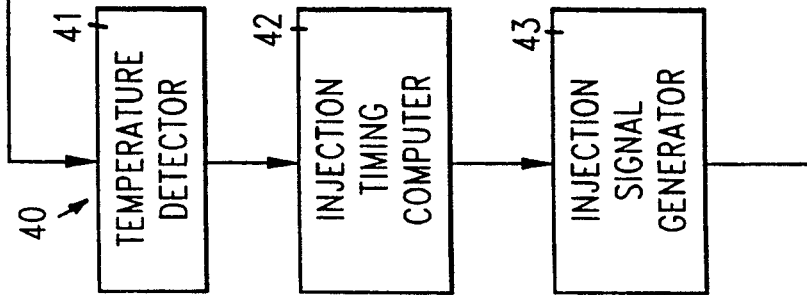
FIG. 7

FUEL INJECTION CONTROL SYSTEM

BACKGROUND OF THE INVENTION

This invention relates to fuel control systems, particularly to fuel injection systems for 2-cycle, internal-combustion engines.

Waves and water level fluctuations cause the load on the propulsion system of a boat to vary. This variation may be significant when the boat is trolling and even while a boat is idling. This in turn causes the engine speed to rise and fall. This variation in engine speed causes irregular combustion, fuel wastage, and may cause the engine to stall. Japanese Unexamined Patent Publication Heil-294936 has disclosed a fuel injection control system which purports to prevent fuel blowby by scavenging the intake air supplied through an intake passage separate from the fuel-air mixture supply system. The system purports to prevent misfire through combustion, under stratified condition around the ignition plug, of fuel-air mixture in the inflammable state.

U.S Pat. No. 4,955,341, to Trombley, et al., shows a system for controlling the idling speed of a direct fuel injected, crank case scavenged, two stroke engine. The system controls the engine speed by either advancing or retarding the fuel injection to the cylinders based on the difference between the actual idling speed and a target idling speed. However, this system controls fuel injection timing only when the throttle is detected in the closed position.

Thus there is felt a need for a fuel injection control system for controlling engine speed at all times during operation of the engine.

SUMMARY OF THE INVENTION

Variation of the engine revolution speed due to load increase caused by waves and water level fluctuations is controlled by the apparatus and method of the present invention. In addition, irregular combustion in the engine is prevented, without sacrificing either fuel efficiency or exhaust gas purification.

The present invention is directed to an apparatus for controlling the speed of a direct fuel injected, scavenged two stroke engine, comprising an engine speed sensing means, a first sensor for sensing the degree to which the throttle is open, means for producing a desired engine speed based on the degree to which the throttle is open and a comparing device for producing a signal corresponding to the difference between the engine speed sensed by the engine speed sensing means and the desired engine speed. A control device adjusts an engine running parameter based on this difference.

BRIEF DESCRIPTION OF THE DRAWINGS

FIG. 7 is a side view of an outboard motor according to a second embodiment of the present invention.

FIG. 8 is a graphic representation of the relation between the difference between the detected and desired engine temperature and the advancing or retarding of the injection timing.

DETAILED DESCRIPTION

Figure 1:
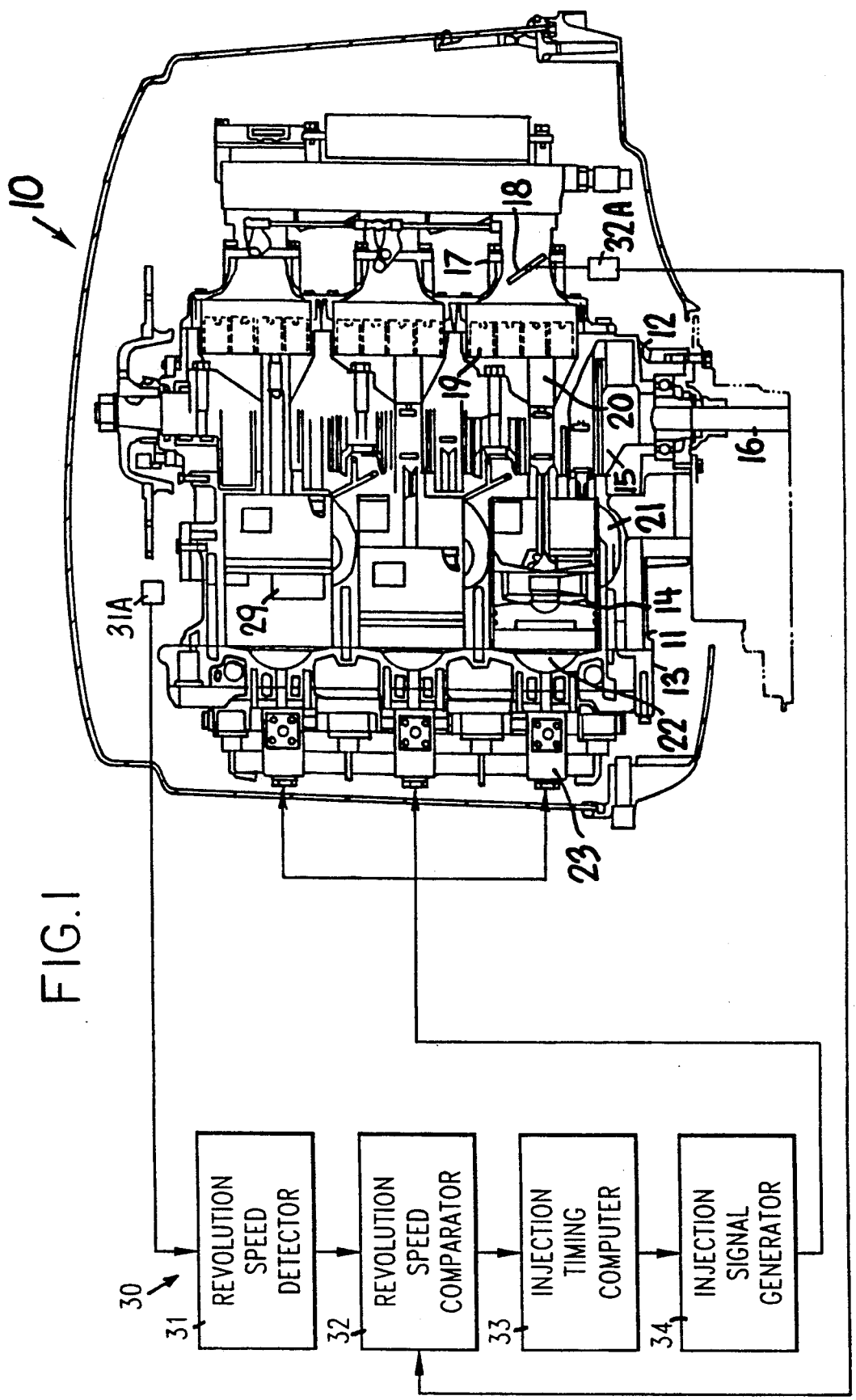
FIG. 1 shows a show an outboard motor according to a first embodiment of the present invention.
Figure 2:
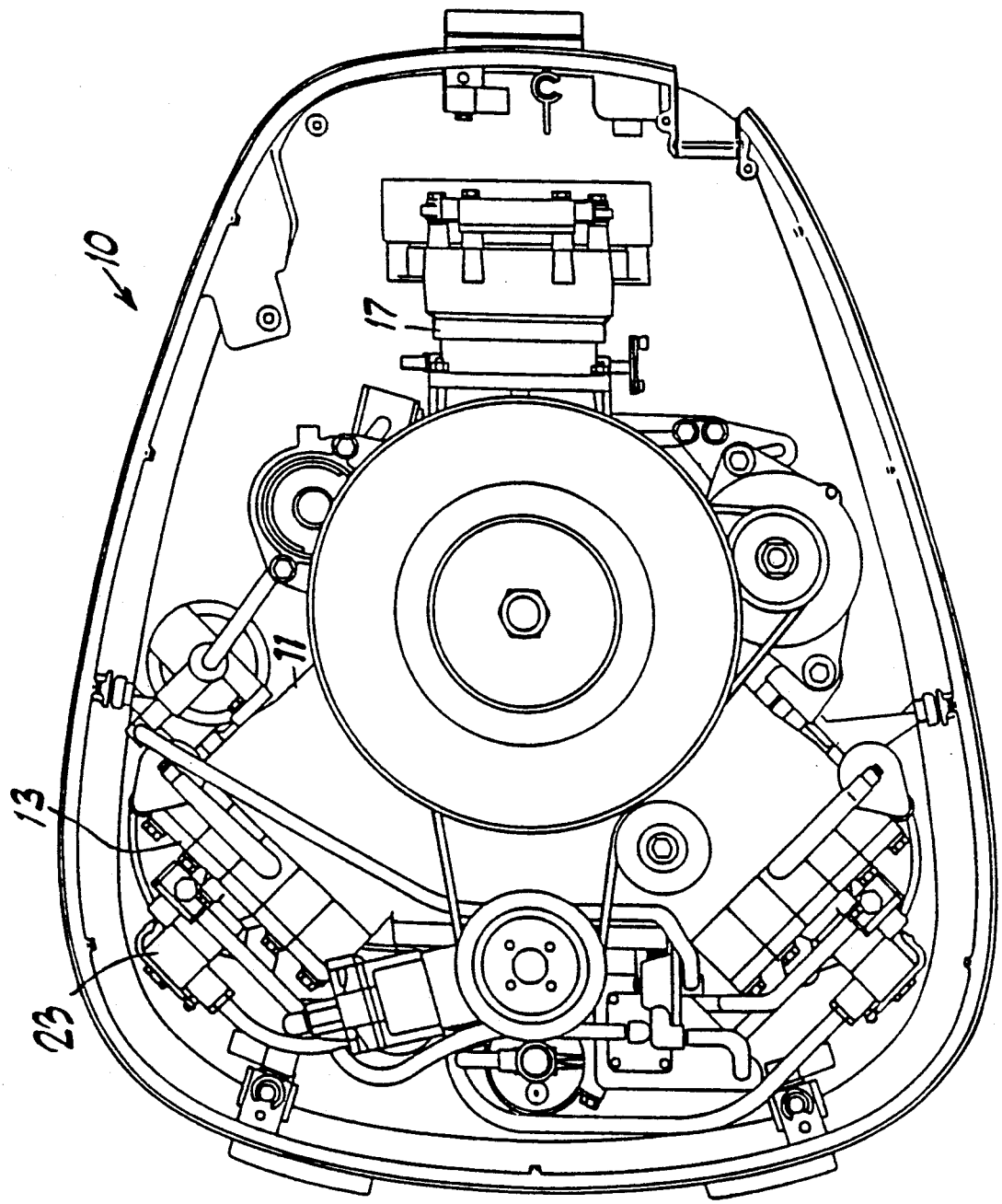
FIG. 2 is top view of an outboard motor embodying the present invention.

FIGS. 1 and 2 show an engine 10 for an outboard motor according to a first embodiment of the invention. The engine 10 is a 2-cycle engine mounted on the top of the propulsion unit (not shown) and having a cylinder block 11, a crankcase 12, a cylinder head 13 pistons 14, and a crankshaft 15 to the lower end portion of which is connected the drive shaft 16 of the propulsion unit.

Figure 3:
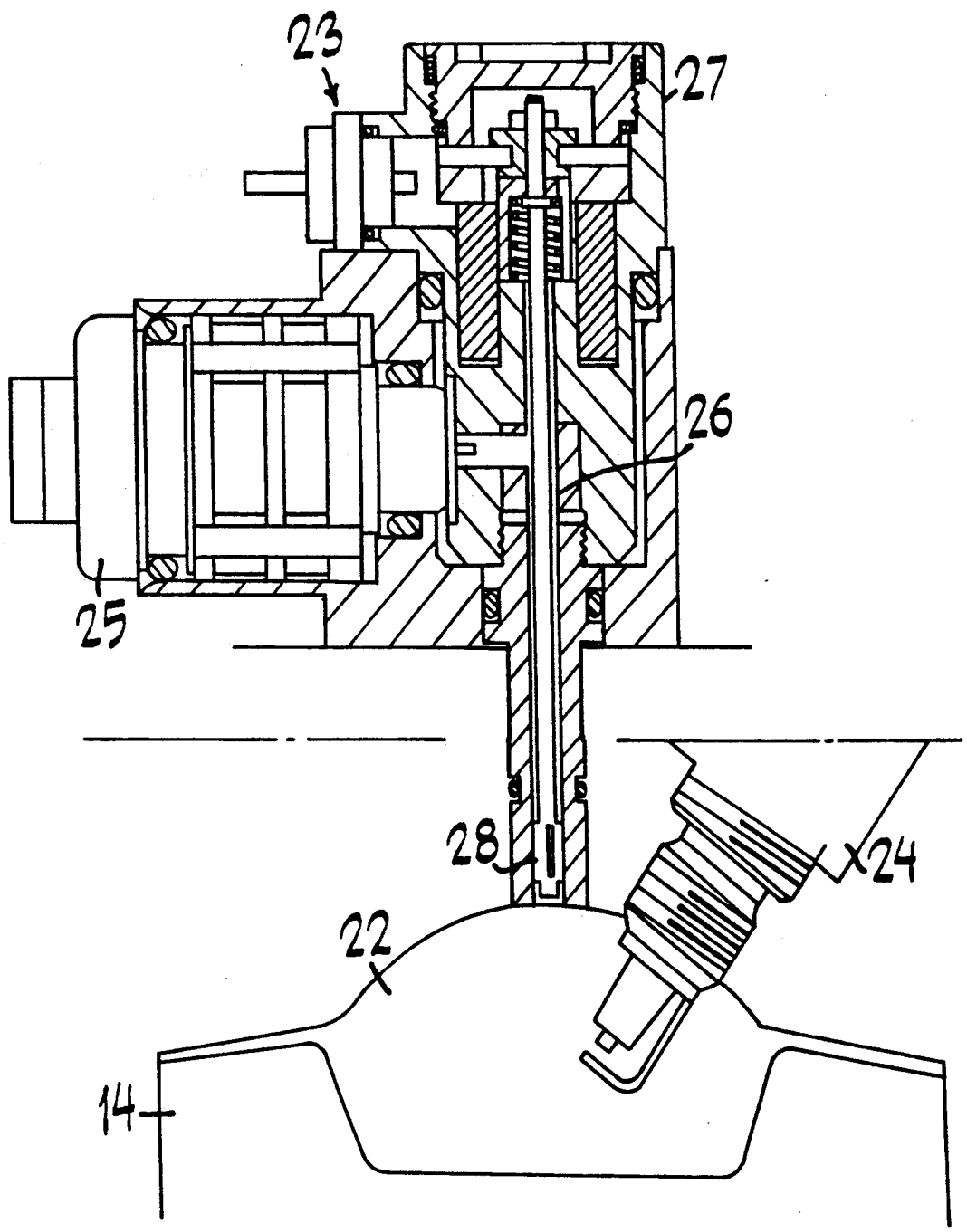
FIG. 3 shows a fuel injector and spark plug arranged in a cylinder of an engine according to the present invention.

In the engine 10, air is taken into the combustion chamber 22 through an intake passage constituted of a throttle valve 18 installed in the intake pipe 17 connected with the crankcase 12, a reed valve 19, crank chamber 20 and a scavenging passage 21, while fuel-air mixture is directly injected into the combustion chamber 22 portion around the ignition plug 24 by an injecting device 23 mounted on the cylinder head 13 (FIG. 3).

Figure 4:
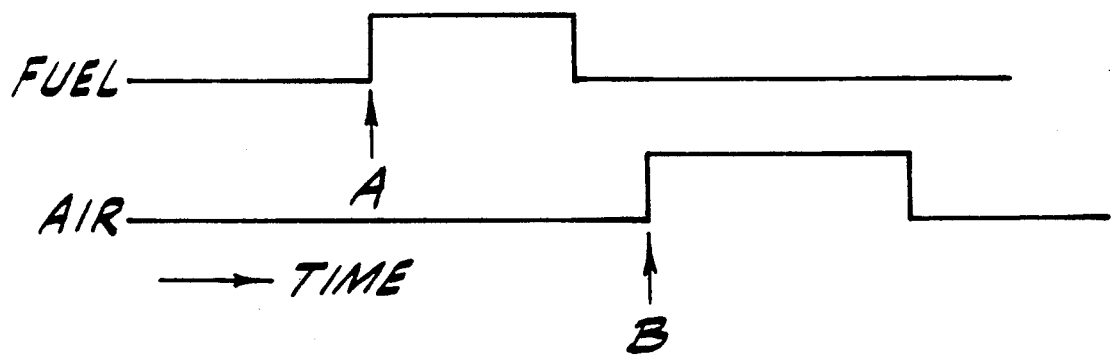
FIG. 4 is a graphic representation of the relative timing of the feeding of fuel to a metering device chardged with high pressure air and the subsequent injection of this fuel-air mixture to the cylinder.

The injection device 23 meters fuel fed by a fuel pump (not shown) through a pressure regulator with its metering device 25, and supplies the metered fuel to the metering chamber 26 at the supply starting timing A shown in FIG. 4. The metering chamber 26 is kept supplied with compressed air from an air compressor at a pressure regulated by a pressure regulator, and the fuel supplied in the metering chamber 26 is injected, as fuel-air mixture, into the combustion chamber 22 when the injection valve 28 is opened at the injection starting timing B shown in FIG. 4. The engine 10 is also provided with an exhaust passage 29.

As shown in FIG. 1, according to a first embodiment of the present invention, engine 10 has a fuel injection control system 30 for controlling the injection device 23 composed of a revolution speed detector 31, a revolution speed comparator 32, an injection timing computer 33 and an injection signal generator 34 as shown in FIG. 1.

The revolution speed detector 31 detects the current engine revolution speed through a pulser coil 31A installed on the engine 10 around the upper end portion of the crankshaft 15, and the revolution speed comparator 32 compares the current engine revolution speed detected by the revolution speed detector 31 with the desired revolution speed obtained from the throttle opening detected by the throttle opening detector 32A. The desired revolution speed is stored as a two-dimensional map in the memory integrated in the fuel injection control system 30, and is calculated based on the throttle opening angle.

Figure 6:
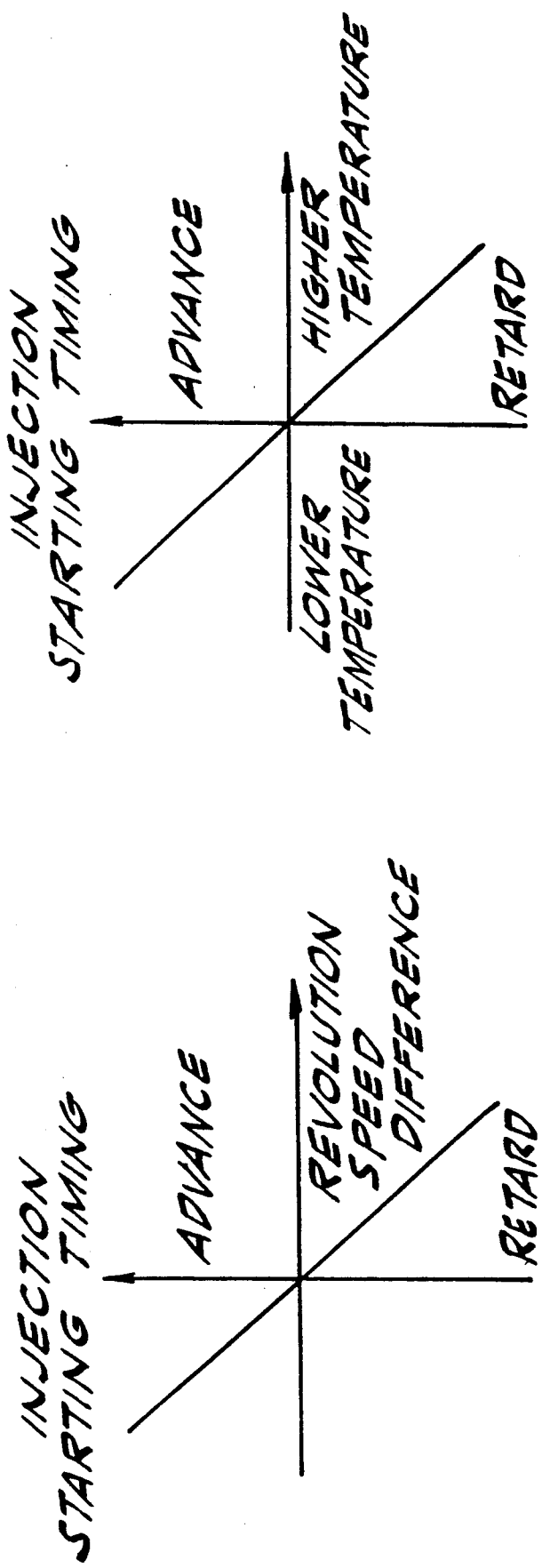
FIG. 6 is a graphic representation of the relation between the difference between the detected and desired engine speeds and the advancing or retarding of the injection timing.

The injection timing computer 33 adjusts the injection starting timing of the injection device 23 in response to the comparison result of the revolution speed comparator 32 as shown in FIG. 6; it advances the injection starting timing when the detected engine revolution speed is lower than the desired revolution speed, and it retards the injection starting timing when the detected engine revolution speed is higher than the desired revolution speed. In addition, other engine parameters such as the amount of fuel injected to the cylinder and the timing of the spark, may be adjusted in response to the comparison result of the revolution comparator 32.

The injection signal generator 34 delivers an injection valve opening signal to the injection device 23 at the injection starting timing based on the computing result of the injection timing computer 33. The injection valve opening signal is generated when the throttle opening angle is smaller than a constant angle stored in the memory integrated in the fuel injection control system 30.

In operation, 2-cycle engine 10, a fuel-air mixture including at least Q mm$^3$ of fuel per cycle is injected from the injection device 23 to provide the appropriate fuel-air mixture in the combustion chamber portion around the ignition plug 24. In addition, excessive air sufficient for improving fuel consumption and exhaust gas purification is taken into the combustion chamber 22. This allows the injection starting timing to be retarded so that the revolution speed can be lowered even if the Q mm$^3$ of fuel per cycle is perfectly combusted and develops a great amount of energy.

Figure 5:
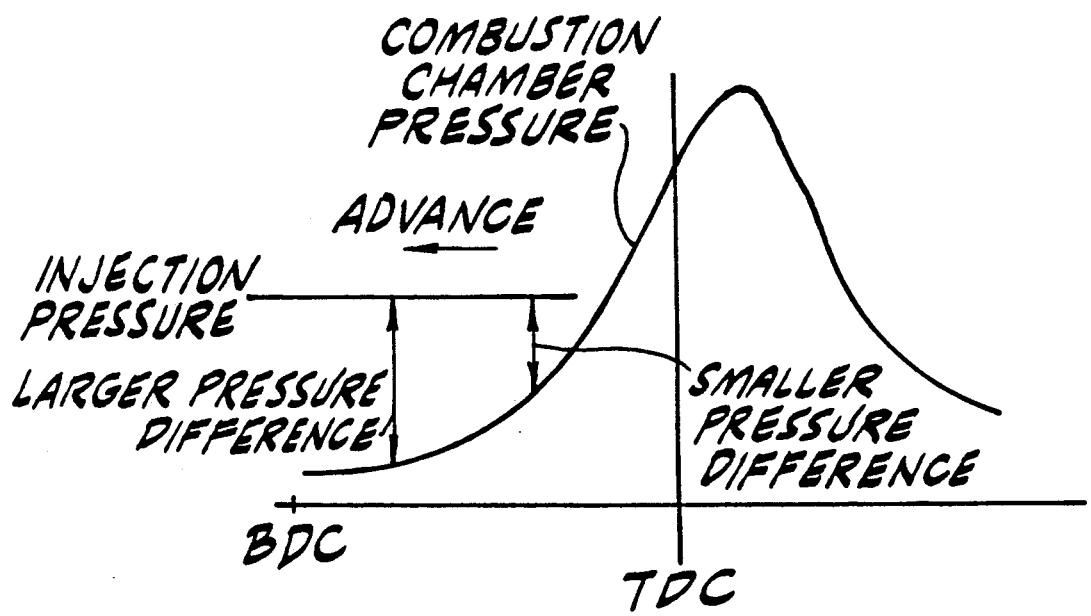
FIG. 5 is a graphic representation of the pressure in the cylinder over time during the compression stroke.

In engine 10, the larger the pressure difference between the fuel-air mixture and the combustion chamber interior the more complete is the atomization of the fuel. That is, the more advanced the injection starting timing as shown in FIG. 5, the better the fuel atomization. This in turn improves fuel combustion.

Therefore, when the engine load increases due to waves or water level fluctuations while idling or trolling and the engine revolution speed is lowered, the control system 30 advances the injection starting timing in response to the drop in engine revolution speed. By this timing advance, fuel atomization and accordingly fuel combustion are improved, energy development is increased, and the engine revolution speed is raised.

Figure 9:
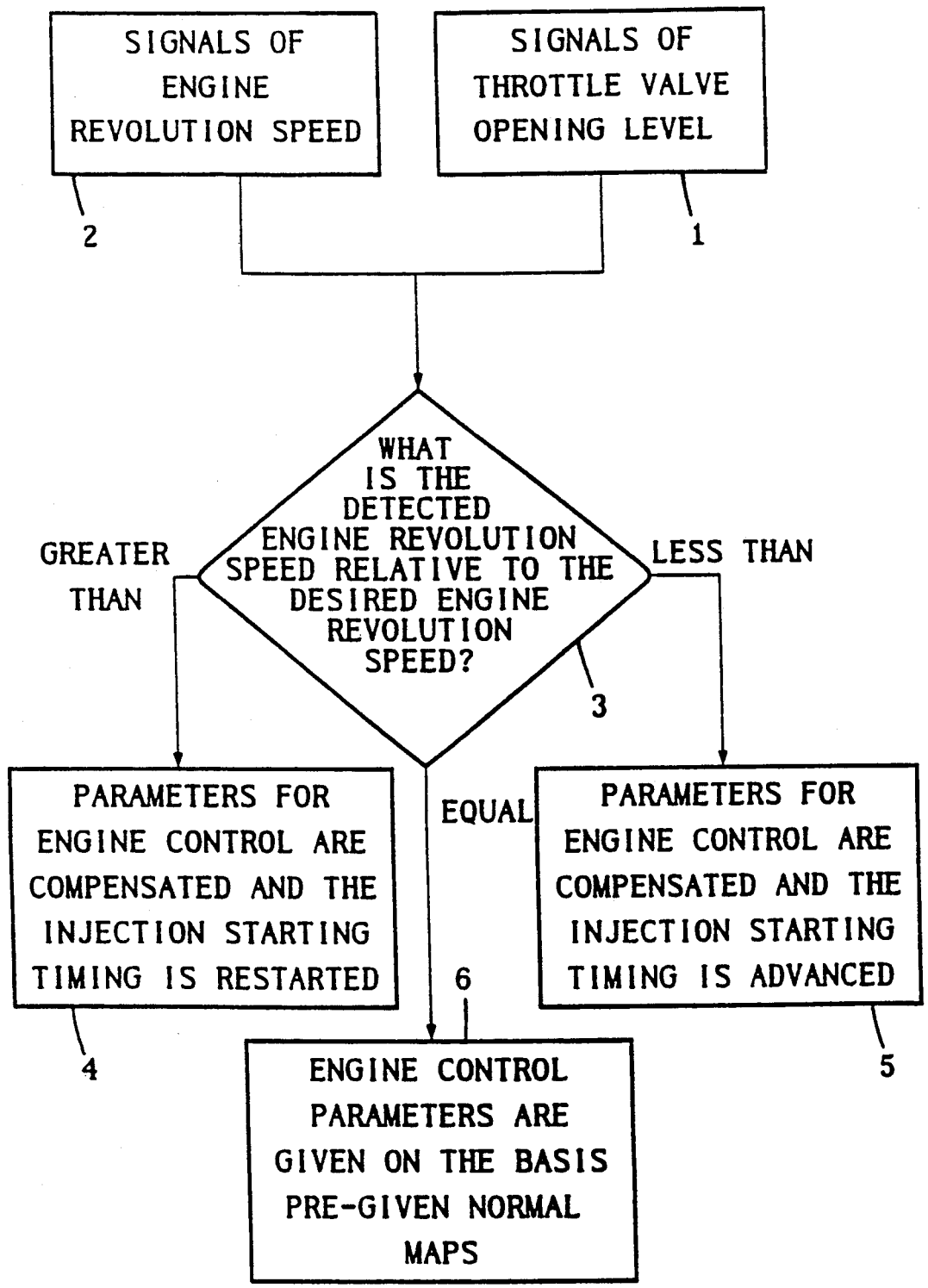
FIG. 9 shows a flow chart illustrating the operation of a first embodiment of the present invention.

FIG. 9 is a flow chart illustrating the operation of the first embodiment of the present invention. In step 1 of FIG. 9 the current throttle opening level is detected and in step 2 shows the current engine revolution speed is detected. In step 3 a desired engine revolution speed based on the detected level of throttle opening is compared with the detected current engine revolution speed. When the current engine revolution speed is greater than the desired engine revolution speed the injection start timing is retarded in step 4. When the detected engine revolution speed is equal to the desired engine revolution speed injection start timing is adjusted based on a predetermined normal value in step 6. Finally, when the detected engine revolution speed is less than the desired engine revolution speed, the injection start timing is advanced in step 5. Other engine control parameters may also be varied in response to the detected difference between the detected and desired engine revolution speeds, to achieve the desired engine revolution speed.

That is, the engine revolution speed drop caused by the load increase can be prevented without sacrificing fuel consumption and exhaust gas purification.

As shown in FIG. 7, according to a second embodiment of the present invention, engine 10 has a fuel injection control system 40 for controlling the injection device 23 composed of a temperature detector 41 for detecting the engine temperature through a temperature sensor 41A secured on the outside of the engine 10, an injection timing computer 42 and an injection signal generator 43.

The injection timing computer 42 adjusts the injection starting timing of the injection device 23 in response to the detection result of the temperature detector 41 a shown in FIG. 8; it advances the injection starting timing when the engine temperature is lower than the predetermined one (an engine temperature above which the engine has warmed-up), and it retards the injection starting timing when the engine temperature is higher than the predetermined one.

The injection signal generator 43 delivers an injection valve opening signal to the injection device 23 with the injection starting timing based on the computing result of the injection timing computer 42.

A fuel-air mixture including at least Q mm$^3$ of fuel per cycle is injected from the injection device 23 to let the appropriate mixture exist in the combustion chamber portion around the ignition plug 24 while excessive air sufficient for improving fuel consumption and exhaust gas purification is taken in to the combustion chamber 22. The injection starting timing is retarded in response to an increase in engine revolution speed so that the revolution speed can be lowered even if the Q mm$^3$ of fuel per cycle is perfectly combusted and develops a great amount of energy.

Figure 10:
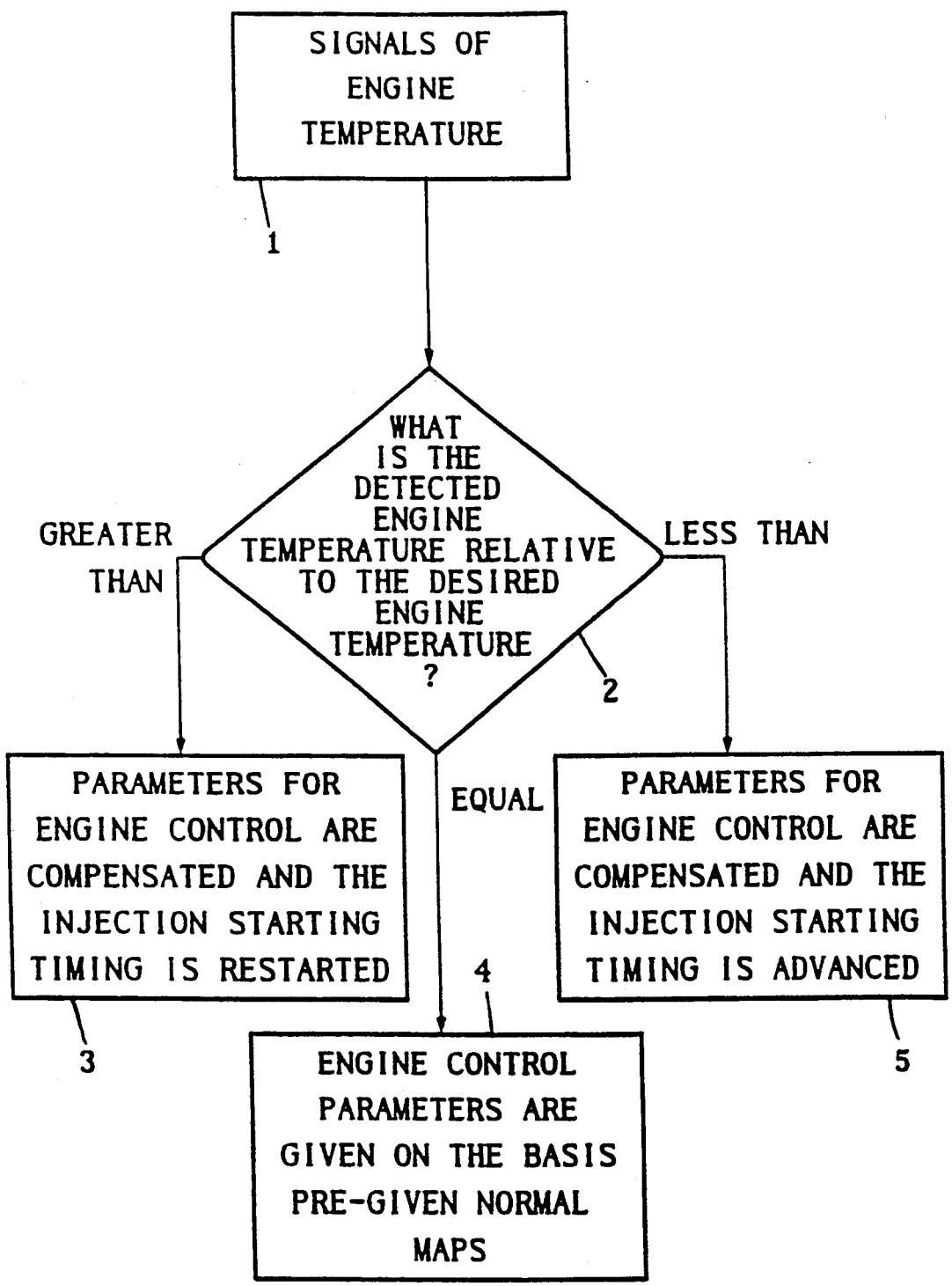
FIG. 10 shows a flow chart illustrating the operation of a second embodiment of the present invention.

The operation of an engine according to the second embodiment of the present invention is illustrated in FIG. 10.

The engine temperature detected in step 1 of FIG. 10 is fed to step 2 where it is compared to a desired engine temperature level. When the detected engine temperature is greater than the desired temperature level, the injection timing is retarded, in step 3. Where the detected and desired engine temperatures are equal the injection timing is adjusted based on predetermined normal values, in step 4. Finally, when the detected engine temperature is less than the desired temperature the injection timing is advanced in step 5. Other engine control parameters may also be varied, in response to the detected difference between the detected and desired engine temperatures, to achieve the desired engine speed.

When the engine temperature is lower and, accordingly, fuel atomization is poor, the fuel injection control system 40 advances the injection starting timing, which serves for improving fuel atomization and stabilizing fuel combustion as described above for the first embodiment. That is, irregular combustion caused by the lower engine temperature can be prevented without sacrificing fuel consumption and exhaust gas purification.

This description preferred embodiments of the invention is for the purpose of illustrating the invention, and is not to be considered as limiting or restricting the invention. Many modifications may be made by those skilled in the art without departing from the teachings of the present invention which is intended to be limited only by the appended claims.

What is claimed is:

1. An apparatus for controlling the speed of a direct fuel injected, scavenged two stroke engine having a throttle comprising:
   a first sensor for sensing the degree to which the throttle is open;
   means for sensing the speed of the engine;
   means for determining a desired engine speed based on the degree to which the throttle is open;

means for producing a signal corresponding to the difference between the engine speed sensed by said engine speed sensing means and said predetermined engine speed; and a control device for adjusting at least one engine running parameter based on said difference to reduce said difference, wherein said control device adjusts a fuel injection timing to reduce said difference.

2. An apparatus according to claim 1, wherein fuel injection timing is advanced when the engine speed is lower than the predetermined engine speed, and is delayed when the engine speed is greater than the predetermined engine speed.

3. An apparatus according to claim 1, wherein said control device adjusts the amount of fuel injected to the cylinder to reduce said difference.

4. An apparatus according to claim 1, wherein said control device adjusts the spark timing to reduce said difference.

5. An apparatus according to claim 1, wherein the means for sensing the speed of the engine includes a pulser coil.

6. An apparatus according to claim 1, wherein the control device includes an injection timing computer.

7. A method for controlling the speed of a direct fuel injected, scavenged two stroke engine comprising the steps of:

sensing the engine speed;

sensing the degree to which the throttle is open;

producing a desired engine speed based on the degree to which the throttle is open;

comparing the engine speed sensed to said predetermined engine speed to determine the difference between the sensed engine speed and the predetermined engine speed; and adjusting at least one engine running parameter based on said difference to reduce said difference, wherein a spark timing is adjusted to reduce said difference.

8. A method according to claim 7, wherein a fuel injection timing is adjusted to reduce said difference.

9. A method according to claim 8, wherein fuel injection timing is advanced when the engine speed is lower than the predetermined engine speed, and is delayed when the engine speed is greater than the predetermined engine speed.

10. A method according to claim 8, wherein an amount of fuel injected to the cylinder is adjusted to reduce said difference.

11. An apparatus for controlling the speed of a direct fuel injected, scavenged two stroke engine comprising:

means for sensing the engine temperature;

means for producing a desired engine temperature;

a comparing device for producing a signal corresponding to the difference between the engine temperature sensed by said engine temperature sensing means and said desired engine temperature; and a control device for adjusting an engine running parameter based on said difference.

12. An apparatus according to claim 11, wherein said engine running parameter is the fuel injection timing.

13. An apparatus according to claim 12, wherein fuel injection timing is advanced when the engine temperature is lower than the predetermined engine temperature, and is delayed when the engine temperature is greater than the predetermined engine temperature.

14. An apparatus according to claim 11, wherein said engine running parameter is the amount of fuel injected to the cylinder.

15. An apparatus according to claim 11, wherein said engine running parameter is the spark timing.

* * * * *